Dec. 31, 1963   E. F. JOHNSTON   3,115,713
PUPILLOMETER
Filed Aug. 10, 1962

INVENTOR
ERNEST F. JOHNSTON
BY
Frank Groom Kirtz
ATTORNEY

United States Patent Office 3,115,713
Patented Dec. 31, 1963

3,115,713
PUPILLOMETER
Ernest F. Johnston 4253 Peck St., St. Louis, Mo.
Filed Aug. 10, 1962, Ser. No. 216,194
2 Claims. (Cl. 33—200)

Various testing devices and instruments are used in conducting optical examinations. These instruments are equipped with pupillary adjustments for centering the lenses, however the inherent purposes of these instruments makes it impossible to determine simply and accurately the pupillary distance.

There is consequently a need for a simple accurate and convenient device for measuring pupillary distance. With such an instrument, it is convenient to make the pupillary measurements first. Subsequently these measurements may be used as a safe guide throughout all of the subsequent tests with the various other instruments, such as the trial frame, the optometer and the phorometer. I have provided such a pupillary measuring device by this invention.

This invention has specific reference to a device to be used by optometrists or optical refractionists in making optical examinations in order to fit patients with glasses. The interpupillary distances are the distances between the centers of the pupils of a patient's eyes when looking straight ahead. Commonly this measurement is made by laying a ruler on the bridge of the patient's nose and observing by the scale on the ruler the distance between the pupils.

It will be noted that I have used the term "interpupillary distances" when referring to one patient's eyes. This is done because the distance between the pupils varies. The two common measurements desired are the interpupillary distance when the patient has his eyes focused on infinity, the so-called Far Point measurement, and the interpupillary distance when the patient's eyes are focused at near or "focal distances," the so-called Near Point measurement.

One of the objects of this invention is to provide a relatively simple, inexpensive and conveniently usable device of this character which will give accurate measurements such as described above and which will overcome the following problems.

It is impossible to measure the Far Point, which is the interpupillary distance with the eyes focused at infinity, when the operator, that is the person making the measurement, is standing in front of the person being measured. The reason for this is that the patient's eyes immediately focus on the operator. Yet, for the ordinary measurement method, the operator must stand in front of the patient. This difficulty is obviated with my pupillometer since it is only necessary to tell the patient to focus his eyes on some relatively distant object which he can readily see through the instrument.

Likewise it is difficult to measure the Near Point, which is the interpupillary distance with the patient's eyes focused on some near object with the patient looking straight ahead. The reason for this is that the patient usually turns his eyes down to view near objects in hand. When being measured with an ordinary ruler, the effect is to turn the ruler away from the position where it can be read by the operator.

With my device, the interpupillary distances can be measured in a natural way without obstructions to the view, while the actual distances between the pupils can be recorded as the patient sees the far or the near object.

Another object of my invention is to utilize pin holes in my pupillometer. With the pin holes, the patient is seeing through the center of his lenses, where the refractive error is least. There are several advantages in this. First the pin holes afford a sharper distant view, then they present a clearer near view. Both effects act to hold the patient's attention and give a truer measurement, since the patient's eyes are less likely to wander.

An additional object of my invention is to provide a pupillometer in which two pin holes are used for viewing. The one is fixed in position and the other is movable, being placed on a slide which is moved with respect to the first. There are various advantages from such a novel construction which will become apparent from a study of the specification which follows.

The invention is illustrated in the accompanying drawing, which will now be described and thereafter the invention will be pointed out in claims, reference now being had to the drawing in which:

Figure 1:
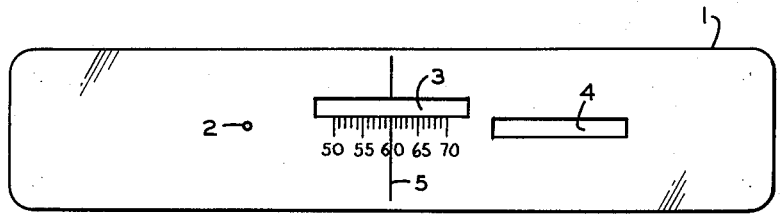
FIG. 1 is a front elevation of the scale of the pupillary distance-measuring device embodying the invention.

The embodiment of the invention shown in the drawing comprises a scale member 1, consisting of a flat, thin member, which can be made of plastic, such as Lucite or polyethylene, or of a thin sheet of metal, such as aluminum or of any similar material, which indeed can be used through the device.

The scale member is provided with a left eye pinhole 2, a scale slot 3, a right eye slot 4 and a scale 5 marked along the edges of the scale slot 3.

Figure 2:
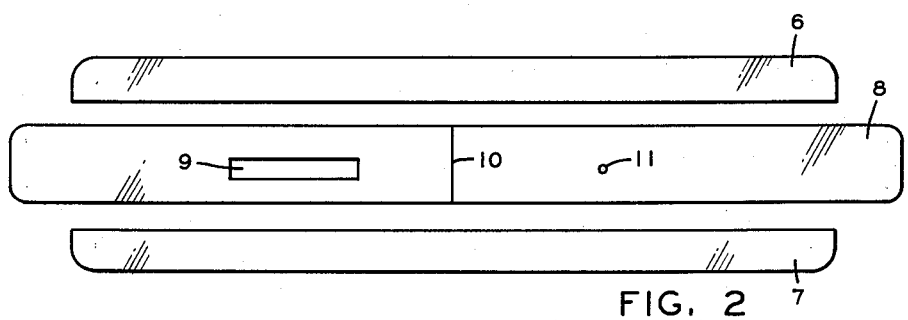
FIG. 2 is a composite elevation of the three elements which comprise the central portion of the device.

The central portion of the device is shown in FIG. 2. There is shown a top rail 6, and a bottom rail 7, whose purpose it is to guide and contain therebetween the slide portion of the device, which is denoted by the numeral 8. The slide 8 is provided with a left eye slot 9, an indicator mark 10 and the right eye pinhole 11.

Figure 3:
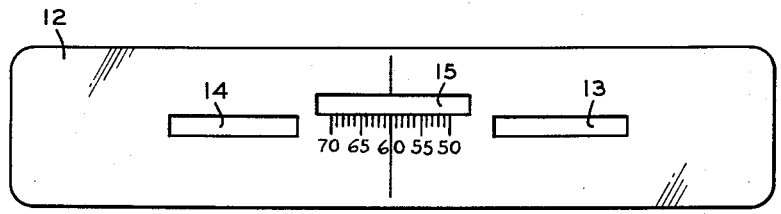
FIG. 3 is a plan view of the back element of the device.

The back portion of the device is shown in FIG. 3. It consists of a member similar in size and shape to the scale member 1; this back member is denoted by the numeral 12. It is provided with a right eye slot 13, and a left eye slot 14.

Figure 5:
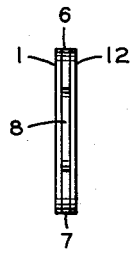
FIG. 5 is a side elevation of the device shown in FIGURE 4, the right portion of FIG. 4 being taken.

The device is assembled as shown in FIGURE 5. The front scale member 1, and the top guide rail 6 and the bottom guide rail 7, and the back member 12 are all fastened together, while the slide 8 is allowed to slide freely between, being surrounded on all four sides by the above members as will be seen from FIGURE 5.

When assembled the device is used in the following manner. The patient is being measured for the Far Point. He is instructed to look through the left eye pinhole 2 with his left eye. Then the slide 8 is moved in or out, while the patient's left eye is focused on some distant object, until the patient's right eye can see that object through the right eye pinhole 11. The device will then appear as in FIG. 4. The patient will have been able to see the distant object with both eyes clearly, in the following manner.

The left eye looks through the left eye pinhole 2, the left eye slot 9 in the slide 8, and the left eye slot 14 in the back member 12. The right eye looks through the right eye pinhole 11 on the slide 8. It must be noted however that the right eye pinhole 11 lies between the right eye slot 4 on the scale member 1 and the right eye slot 13 on the back member 12.

Figure 4:
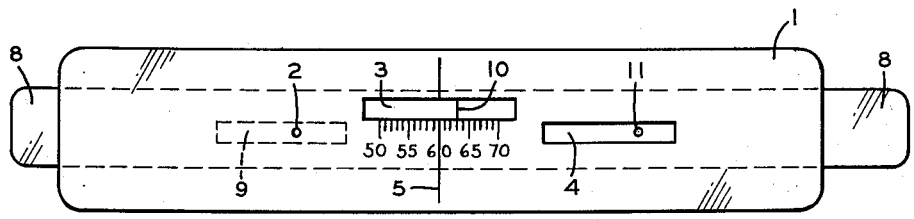
FIG. 4 is a front elevation of the assembled device.

The device is then removed from the patient's eyes and the marker or indicator mark 10 is seen, as in FIG. 4 to lie on the mark 63 of the scale 5. It will be noted that the scale 5 runs from 50 to 70, these figures representing millimeters, thus the reading shown in FIG. 4 means that the distance between the left eye pinhole 2 and the right eye pinhole 11 in that position is 63 millimeters. Thus the Far Point measurement of the interpupillary distance is 63 millimeters.

The same procedure is repeated with the patient's eyes focused on a near object. The left or fixed pinhole 2 is placed before the left eye. The slide 8 is then moved in or out until the patient can see the near object clearly through both the left pinhole 2 and the right pinhole 11. Then the indicator mark 10 on the slide 8 is read against the scale 5. The reading taken on the scale 5 with the patient's eyes focused through the pinholes on a near object, is the Near Point measurement of the interpupillary distance.

It will be noted that the use of the fixed pinhole allows the patient to first focus one eye, whether it be at infinity, that is a far distance, or at a near object. I have found this particularly effective since it enables the patient to follow readily the requirements of the operator. Once the one eye is focused, the other eye can be made to focus more easily since this is accomplished by the use of the slide bearing the second pinhole, that is the movable one.

Of course it is obvious that the patient can be handed the instrument in a reversed position, so that the fixed pinhole 2 can be applied to the right eye, and then the movable pinhole 11 will be applied to the left eye. This is particularly useful in the following connection. It is well-recognized that generally one of the patient's eyes is the so-called "dominant" eye. Consequently this eye is usually used for the first or fixed pinhole. This can be accomplished by turning the device around and presenting the fixed pinhole 2 to that eye which is dominant.

Similarly, I have provided a second scale slot 15 on the back member 12. A scale similar to the scale 5 on the scale member 1 can be printed on the back member 12 under the second scale slot 15. Then if the slide member is turned around, or if the indicator mark 10 is printed on both sides of the slide member 8, the operator can read the interpupillary distances while the patient has applied the front portion of FIG. 1 to his eyes. Thus the reading can be taken without removing the device from the patient's eyes.

The device is particularly successful in the reading of the Near Point interpupillary distance, in which the custom is to lay a ruler against the patient's nose and try to read the interpupillary distance with the patient looking at some object close. The patient may and generally does lower his head and this makes reading the scale of the ruler difficult. This is obviated with the present invention, since the scale reading remains fixed in position on the slide against the scale and may be read conveniently.

In addition, the determination of the Far Point interpupillary measurement is simplified with my device. The patient is not asked, as is the present custom, to focus his eyes at infinity, that is upon a distant object, with someone, that is the operator, directly in front of him, trying to read the interpupillary distance. The taking of this measurement is much more convenient with my device.

It is obvious that various modifications may be made in the constructions shown in the drawing and above particularly described, within the principle and scope of the invention as defined in the appended claims.

I claim:

1. A pupillometer consisting of a scale member and a back member, a top rail and a bottom rail between said scale member and said back member, a slide freely slidable between said top rail and said bottom rail, and between said scale member and said back member, a left eye pinhole, a scale slot, and a right eye slot on said scale member, and a scale on said scale member adjacent said scale slot, a left eye slot on said back member cooperative with said left eye pinhole on said scale member, and a right eye slot on said back member cooperative with said right eye slot on said scale member, a left eye slot on said slide cooperative with said left eye pinhole and said left eye slot on said back member, and a right eye pinhole on said slide cooperative with both right eye slots aforesaid.

2. A pupillometer as described in claim 1, further characterized by a second scale slot on said back member, and a second scale printed on said back member adjacent said second scale slot.

References Cited in the file of this patent

UNITED STATES PATENTS

| 1,935,175 | Clement | Nov. 14, 1933 |
| 2,536,367 | Holmes | Jan. 2, 1951 |
| 2,596,264 | Macbeth | May 13, 1952 |